United States Patent [19]
Buhrgard et al.

[11] Patent Number: 5,604,739
[45] Date of Patent: Feb. 18, 1997

[54] SIGNAL RECEIVING AND TRANSMITTING UNIT FOR CONVERTING A TRANSMISSION RATE OF A RECEIVED SIGNAL TO A TRANSMISSION RATE OF A TRANSMITTTED SIGNAL

[75] Inventors: Karl S. M. Buhrgard, Stockholm; Johan U. Tingsborg, Solna; Mats L. B. Lindblom, Johanneshov; Hao Jiang, Bandhagen, all of Sweden

[73] Assignee: Telefonaktiebolaget LM Ericsson, Stockholm, Sweden

[21] Appl. No.: 320,660

[22] Filed: Oct. 11, 1994

[30] Foreign Application Priority Data

Oct. 12, 1993 [SE] Sweden .................... 9303338

[51] Int. Cl.$^6$ ........................................ H04J 3/22
[52] U.S. Cl. .................... 370/468; 370/536; 370/391
[58] Field of Search .................... 370/60, 60.1, 58.1, 370/84, 112, 66, 118, 68

[56] References Cited

U.S. PATENT DOCUMENTS

| | | | |
|---|---|---|---|
| 4,589,108 | 5/1986 | Billy | 370/84 |
| 4,685,101 | 8/1987 | Segal et al. | 370/112 |
| 4,807,221 | 2/1989 | Stummer | 370/112 |
| 4,905,228 | 2/1990 | Angell et al. | 370/84 |
| 4,975,901 | 12/1990 | Poli | 370/58.1 |
| 5,323,399 | 6/1994 | Kurano | 370/58.1 |
| 5,363,370 | 11/1994 | Abiven | 370/84 |
| 5,365,519 | 11/1994 | Kozaki et al. | 370/60 |
| 5,471,465 | 11/1995 | Gamm | 370/84 |

OTHER PUBLICATIONS

M. Larsson et al., "The ATM Switch Concept and the ATM Pipe Switch," Ericsson Review, No. 1, pp. 12–20 (1993).
Peter Staxen et al., "The Telecom Evolution in the Broadband Era", Ericsson Review, No. 1 pp. 2–11 (1993).

*Primary Examiner*—Douglas W. Olms
*Assistant Examiner*—Chau T. Nguyen
*Attorney, Agent, or Firm*—Burns, Doane, Swecker & Mathis, L.L.P.

[57] ABSTRACT

A signal receiving and a signal transmitting unit converts an information carrying signal received at a first transmission rate to an information carrying signal transmitted at a second transmission rate that differs from the first transmission rate. Several inputs and outputs are available, each input structured for a transmission rate that is different from the transmission rates of remaining inputs, and each output structured for a transmission rate that is different from the transmission rates of remaining outputs. One signal receiving input can be connected to one signal transmitting output depending on signals occurring on one or more control conductors, wherein a selected control conductor and/or selected signal information selects and initiates a conversion mode having a selected conversion index.

21 Claims, 3 Drawing Sheets

SIGNAL RECEIVING AND TRANSMITTING UNIT FOR CONVERTING A TRANSMISSION RATE OF A RECEIVED SIGNAL TO A TRANSMISSION RATE OF A TRANSMITTTED SIGNAL

BACKGROUND

The present invention relates to a signal receiving and a signal transmitting unit adapted to receive and further transmit an information-carrying signal with no change in the information content of the signal.

The invention particularly relates to converting an information-carrying signal received at a first transmission rate to an information-carrying signal which is transmitted at a second transmission rate with the same information content as the received signal.

Several different kinds of signal receiving and signal transmitting units of the aforesaid kind are known to the art.

Different principles of converting the transmission rates of signals through switches and like devices are known and applied in the telecommunications field.

It is also known, and standard, to use different transmission rates, such as 155 Mb/s and 622 Mb/s and also other transmission rates, such as 2.5 Gb/s, for instance.

Also known to the art are multiplexing signal receiving and signal transmitting units in which signals received on a connection have a signal transmission rate of 155 Mb/s and are converted to a connection transmitted signal having a transmission rate of 622 Mb/s.

Similar units are also known in which this rate conversion can be effected from 155 Mb/s to 2.5 Gb/s.

Also known to the art are demultiplexing units in which the signal transmission rate is converted from 622 Mb/s to 155 Mb/s, and so on.

Units of this kind are also known for conversion of other signal transmission rates.

Normally, such units are adapted for one single conversion index and each desired rate conversion requires a unit which corresponds to the chosen rate conversion.

Consequently, several such units are required for different purposes within switching equipment and other types of electronic equipment.

With regard to the present invention and to its particular application, it can be mentioned that a signalling pattern is known in which information-carrying data packets, such as ATM cells, are transmitted, either in series or in parallel, on each of a number of available connections.

A signalling pattern is also known in which a number of available lines are adapted to the number of bit positions in a word within a data packet, such as an ATM cell, and the signal on each of these lines is permitted to carry the content of respective bit positions simultaneously, wherein a number of instantaneous bit positions occurring on these lines together represent the signal information of a data word.

The present invention can be applied advantageously in a system described in Ericsson Review No. 1, 1993, in the articles "The ATM Switch Concept and The ATM Pipe Switch" by Mikael Larsson, et al, and "The Telecom Evolution in the Broadband Era" by Peter Staxén, et al.

SUMMARY

When considering the prior art as described above, it will be seen that a technical problem resides in the ability to provide a novel signal receiving and signal transmitting unit which is not only able to convert one single received information-carrying signal to one single other transmitted information-carrying signal with a single specific relationship between the transmission rates, but which will also afford the possibility of choosing one of a number of incorporated transmission rates for received information-carrying signals and enable the conversion of one such received signal to a transmitted signal which, in turn, can be selectively allocated another transmission rate from a plurality of available transmission rates.

It will also be seen that a technical problem is one of realizing that the use of such a unit having a plurality of available signal receiving inputs where each input is adapted to receive information-carrying signals, such as data packets, at a transmission rate which differs from the transmission rates of other inputs within a telecommunications system which has different requirements on transmission rates requires each input to be connectable to an output for transmitting information-carrying signals, such as data packets, chosen from several available outlets, where each outlet is adapted to a transmission rate which differs from the transmission rates of remaining outlets.

Another technical problem is one of realizing and implementing in a simple manner the choice of one conversion method from a number of available conversion methods for multiplexing or demultiplexing purposes.

A further technical problem is one of realizing that the choice of conversion mode can be made in accordance with the control signals occurring on one or more control lines, where a selected control line and/or the signal information of a control signal will initiate and select a conversion mode with a chosen conversion index related to the transmission rates.

It will also be seen that a technical problem resides in realizing that a signal receiving and a signal transmitting unit which has successfully solved one or more of the aforesaid technical problems finds particularly suitable application when a received information-carrying signal and a transmitted information-carrying signal are comprised of packets of data where each packet includes at least an addressable part and an information-carrying part and can therefore be included advantageously in an ATM system.

It will also be seen that a technical problem resides in realizing the significance of and the consequences associated with adapting available inputs and available outputs for a determined conversion relationship between selected transmission rates such that the conversion ratio is changed, increased or decreased, by a factor of "four" and therewith realize and utilize the advantages of being able to reduce or to increase the number of lines by a factor of "four".

It will also be seen that a technical problem resides in realizing the significance of and the flexibility afforded by constructing a unit in which available inputs and available outputs are structured for three different transmission rates.

A technical advantage is also achieved when respective inputs and outputs in a unit of this kind are adapted for signal transmission, or traffic, in each of two directions.

Another technical problem is one of realizing the advantages that are afforded with the use of a signal receiving and signal transmitting unit of the aforesaid kind which forms a multiplexing/demultiplexing block adapted for digital signals and which is constructed and coordinated to convert a data packet received at a low transmission rate to a transmission rate which is four times higher than the received transmission rate, or vice versa.

In this regard, a technical problem resides in realizing the advantages that are afforded when conversion of the signals or the data packets is effected in a first stage, in a series-parallel conversion stage, and the signals or the data packets are thereafter stored in a memory store whose content can be delivered to a parallel-series converter with clock pulse conversion, through the medium of one or more buffer circuits.

Another technical problem is one of realizing the need for the requisite memory store and the used buffer circuits to be utilized commonly for each signal data packet transmission, irrespective of the transmission direction chosen, and also in realizing the advantages that are afforded hereby.

Another technical problem is one of realizing the significance when receiving data packets or data cells that occur simultaneously on a number of incoming lines in accordance with the two earlier known signalling patterns of converting the information content of the data cells or data packets to a parallel format that can be used internally in the unit.

Another technical problem is one of realizing the simplifications that can be expected when the frequency and/or rate of the clock pulse is chosen at a specific value below the values that exist when receiving and transmitting a data cell on the inputs and outputs of the unit respectively.

A further technical problem is one of realizing the advantages that are afforded by the occurrence of signal information in the form of data packets in an internal parallel format, with the aforesaid presumptions according to which the same synchronizing logic, memory stores, buffer circuits, etc., can be used to selectively connect an available input from a plurality of available inputs to an available output from a plurality of available outputs.

Another technical problem is one of providing a data-packet signal receiving and a data-packet signal transmitting unit having a number of inputs for receiving data packets that have different transmission rates and a number of outputs for transmitting data packets at different transmission rates, wherein one input unit can be used as an output unit and an output can be used as an input.

In regard of a unit of the kind defined in the introduction it will also be seen that a technical problem resides in the creation of conditions with the aid of simple means such as to adapt the total signal bandwidth of transmitted signals to the total signal bandwidth of received signals.

With the intention of solving one or more of the aforesaid technical problems, the present invention takes as its starting point a data packet receiving and data packet transmitting unit which is adapted to convert an information-carrying digital signal received at a first transmission rate to an information-carrying digital signal which is transmitted at a second transmission rate different to the first transmission rate, said information-carrying digital signal being adapted particularly for use with an ATM system in which the information in transmitted signals is advantageously in the form of a number of data packets each of a standard format.

The present invention relates to a unit, an integrated circuit, an ASIC circuit, having a plurality of available inputs for receiving digital signals, wherein each input is adapted to a transmission rate which is different from the transmission rates of other inputs. Each input can be connected to a signal transmitting output chosen from one of several available outputs adapted for digital signals, and wherein each output is adapted to a transmission rate which differs from the transmission rates of other outputs. The choice of input and output is made in accordance with signals occurring on one or several control lines or conductors, wherein a selected control line and/or selected signal information chooses and initiates one of several available conversion modes with a selected rate conversion index.

According to proposed embodiments of the invention, the received information-carrying signals and transmitted information-carrying signals have the form of data packets or data cells, such as data packets or data cells whose signal content is adapted to an ATM system, wherein each packet includes at least an addressable part and an information-carrying part.

According to one embodiment, available inputs and available outputs are adapted so as to clearly transform the transmission rates therebetween, such as increasing or decreasing the transmission rates by a factor of "four", with the number of lines on inputs and outputs therewith being decreased or increased by a factor of "four".

According to another embodiment, available inputs and available outputs within the unit are "three" in number and are structured for three different transmission rates.

According to the invention, respective input units and respective output units are adapted for separated traffic in both directions.

Particular reference is made to a number of multiplexing/demultiplexing blocks which are intended to convert received digital signals which have low transmission rates to a rate which is four times greater than the low transmission rate, while retaining the signal bandwidth.

The relevant conversion of the data signals will preferably be effected in a first stage in a series-parallel conversion, wherein the signals are stored in a memory and can be delivered from the memory to a parallel-series converter having a clock pulse converter for transmission, through the medium of an array of buffer circuits.

The requisite memory and buffer circuits can be used for signal transmission in each of two directions.

According to another embodiment, data cells that are received and that occur on a number of lines are converted to an internal parallel format adapted to the unit, which, in turn, is selected commonly for all available inputs and all available outputs, wherein in the case of requisite signal processing through the internal parallel format, the internal clock pulse rate is chosen at a lower value than the clock pulse rate and transmission rate of signals occurring on the inputs and/or the outputs.

One and the same synchronizing logic, such as memories, buffer circuits, control logic, will preferably be used when connecting one of several available inputs to one of several available outputs.

Those advantages that are primarily afforded by a signal receiving and signal transmitting unit according to the present invention reside in the construction of a single unit, an integrated circuit, an ASIC circuit, which presents a plurality of available inputs for receiving digital signals, wherein each input is adapted to a transmission rate which differs from the transmission rates of remaining inputs, and a plurality of available outputs for transmitting digital signals, wherein each output is adapted to a transmission rate which differs from the transmission rate of remaining outputs.

Each of these inputs can be connected to one of the digital-signal transmitting outputs. This enables one and the same unit, an integrated circuit, and particularly an ASIC circuit, to be used in different telecommunications equipment. A conversion mode desired for a particular application and having a selected conversion index can be chosen by activating one or more control conductors. A selected control conductor and/or selected signal information initiates selection of the conversion mode.

BRIEF DESCRIPTION OF THE DRAWINGS

An exemplifying embodiment of a unit having features characteristic of the present invention and at present preferred and which is adapted for use in a telecommunications system, particularly in an ATM system, will now be described in more detail with reference to the accompanying drawings, in which.

DETAILED DESCRIPTION

Figure 1:
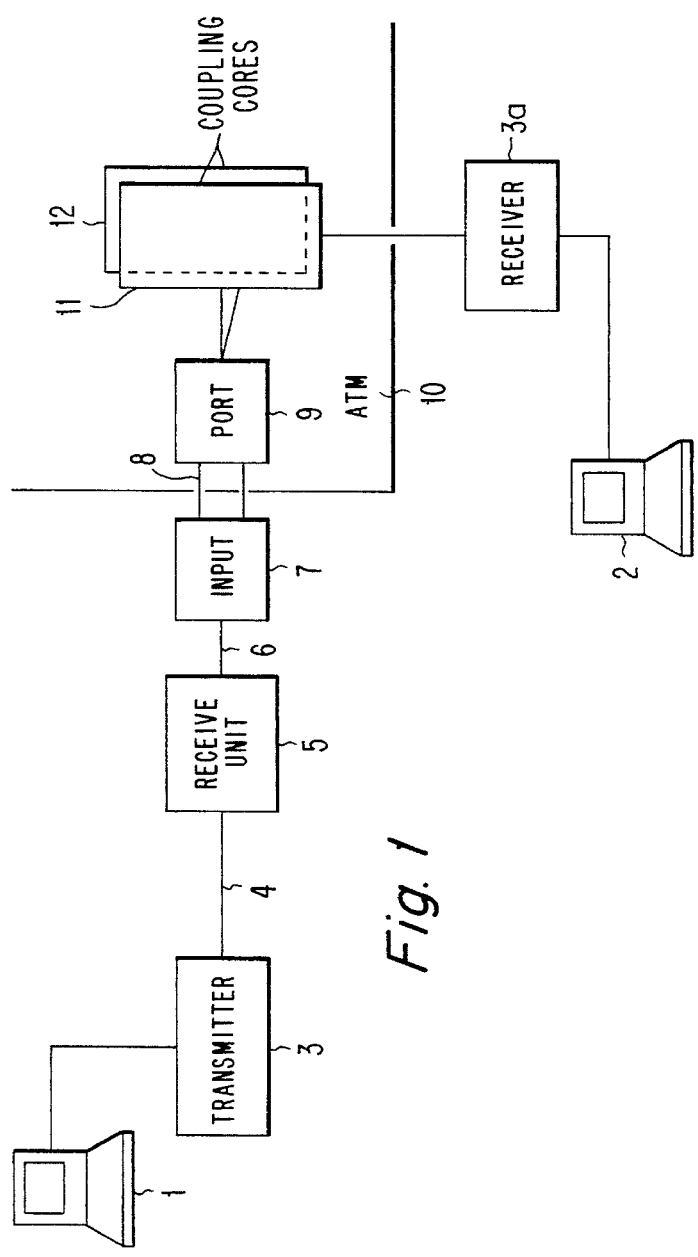
FIG. 1 illustrates the principle construction of a telecommunications system which utilizes ATM technology.

FIG. 1 is a greatly simplified illustration of a telecommunications system designated an ATM system, which utilizes data coordinated in data packets or data cells for its function and its signal exchange.

It will be obvious to the person skilled in this art that the signal exchange is normally two-directional, although for the sake of simplicity the following description will illustrate solely the connection and signal-exchange between a transmitter 3 of a transmitting terminal apparatus 1 and a receiver 3a of a receiving terminal apparatus 2.

The exchange of information between the apparatus 1 and 2 is achieved with the aid of data packets or data cells (20) with data words structured in accordance with an ATM system.

The transmitter 3 coacts over a line or connection 4 with a line-related receiving unit 5 which is connected via a line or connection 6 to an input circuit 7 and which coacts, through a line or connection 8, with a number of coupling ports 9 belonging to an ATM switch 10 provided with two redundant coupling planes or coupling cores 11, 12, and which coacts with the signal receiving unit 3a through the medium of circuits (not shown) corresponding to the circuits 9, 7 and 5.

Each of the lines 4, 6, 8 may consist of one or a number of physical conductors.

Figure 2:
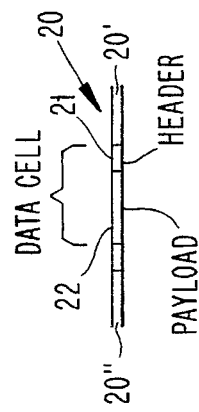
FIG. 2 illustrates schematically serially occurring data packets or data cells used in the ATM system according to FIG. 1.
Figure 4:
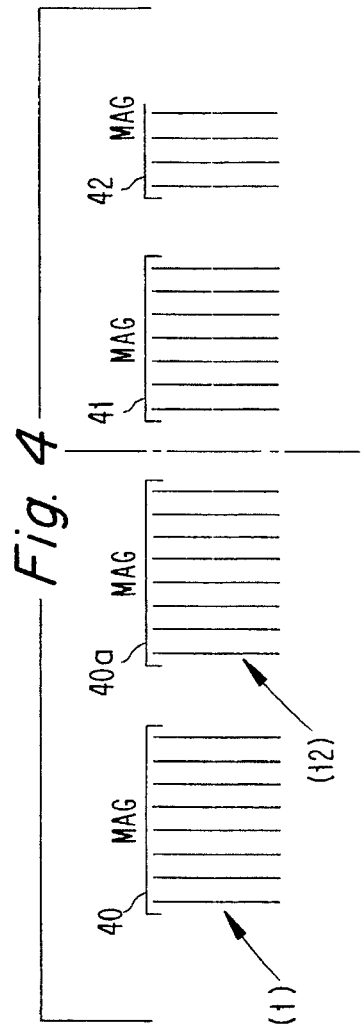
FIG. 4 illustrates schematically the orientation of corresponding circuit boards in an extended telecommunications system according to FIG. 1, wherein redundant boards for the coupling core are coordinated in two magazines, whereas the circuit boards for the connecting devices are coordinated in four magazines.

The function of the ATM switch requires signal transmission to be effected in packets or cells of data, and FIG. 2 illustrates one such packet 20 which may have a five-byte (8-bit words) address information section 21 (Header) and a forty-eight-byte (8-bit words) information-carrying section 22 (Payload). The data cell 20 may also include other information.

It should be noted that when transmitting signals on one single physical conductor, one data cell, 20, will be preceded by a data cell 20' and followed by a data cell 20", wherewith a serial stream of data packets or data cells will pass along the conductor 4.

It is also assumed that the line 4, together with its conductors, is dimensioned and adapted to a serial bit-rate of 155 Mb/sec.

Such serial signal transmission of data cells is referred to as "series transmission" in the following description.

When a similar "series transmission" takes place simultaneously on a plurality of conductors forming a line, this transmission is referred to as a "series transmission through grouped links".

However, each word in a data cell can be transmitted simultaneously over a number of conductors, with the number of conductors corresponding to the number of bit positions in each word used, so that the bit information for a complete word is received simultaneously by a number of receivers.

Such parallel transmission of data cells is referred to in the following as "parallel transmission".

Figure 3:
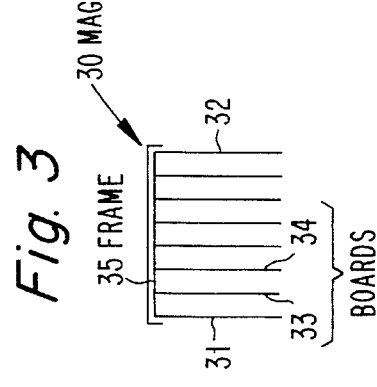
FIG. 3 illustrates schematically the physical orientation of circuit boards for the two coupling planes of the coupling core, and circuit boards for the connecting devices disposed in a magazine.

FIG. 3 illustrates the principle, physical construction of circuit boards placed in a magazine 30 which serves a switch unit 10 or ATM switch of relatively low capacity.

Located at the sides or extremities of the magazine is a respective board 31 and 32, both of which are identical to one another and are provided with conductors and components corresponding to the switch planes or selector planes 11 and 12.

Located between these end boards 31 and 32 are a number of boards which are adapted to form connecting devices, of which six such boards are shown and of which two have been referenced 33 and 34 in FIG. 3.

The device boards 33, 34 are constructed to include circuit structures pertinent to the input circuit 7 and the coupling port 9. Conductors and buses are connected to respective boards 33, 34 and 31, 32 by means of pin connectors. The pin connectors of respective boards coact with circuitry (not shown) mounted in a frame 35 or a backplane.

As will be understood, if it is desired to greatly increase the capacity of a switch 10 with regard to the number of simultaneous telecommunication connections, it is also necessary to increase the rate at which signal transmission is effected within the switch.

A contemplated increase in the capacity of the switch is illustrated by choosing two magazines 40, 40a where all boards disposed in the magazine 40 can be considered to represent the switch plane 11, while all boards disposed in the magazine 40a can be considered to represent the switch plane 12.

Figure 5:
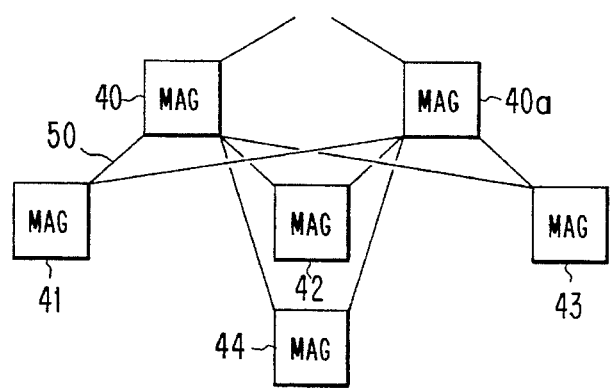
FIG. 5 illustrates the principle coupling required between two redundant coupling or connection planes each allocated a respective magazine, and four magazines for circuit boards applicable to the connecting devices.

Also included are four other magazines 41, 42, 43, 44, which coact with the magazines 40, 40a in the manner illustrated in FIG. 5, in other words, each magazine 41, 42, 43, 44 coacts with the two switch planes 40, 40a through a connection. It will be evident that such a construction will require comprehensive signal transmission at a high transmission rate.

Signal transmission on each line and on each conductor takes place at a high data-pulse rate, wherein typical pulse frequencies are the standardized transmission rates of 155 Mb/s and 622 Mb/s.

Figure 6:
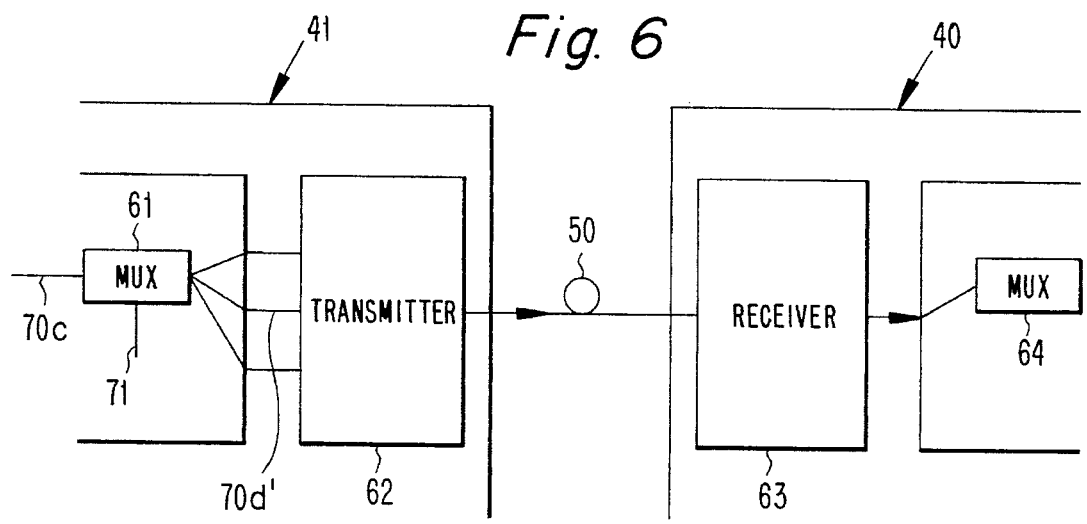
FIG. 6 is intended to illustrate an optical connection, available from a plurality of optical connections, between a switch coupling plane and a magazine intended for circuit boards representative of connecting devices.

As the signal transmission can, in principle, be considered the same for all of the connections shown in FIG. 5, the following description will be restricted solely to include signal transmitting and signal receiving circuits for digital pulses on one line or one connection 50 comprised of a fibre optic and functioning to effect signal transmission between the magazine 41 and the magazine 40 of the FIG. 6 illustration.

The magazine 41 includes a number of integrated circuits on which there is mounted a number of signal multiplexing/demultiplexing blocks, of which one is referenced 61 and which are connected to a transmitter 62 which is adapted to transmit light pulses on the optical link or conductor 50 in response to output signals from the block or the device 61.

The light pulses on the line or conductor 50 are received by a receiver 63 which is adapted to receive the light pulses and to convert said light pulses to electric signals or electric pulses.

These electric pulses are delivered to one of several available multiplexing/demultiplexing blocks 64.

The present invention also includes a particular design of one such block 61 or 64.

The block 61 and the block 64 are mutually identical and consequently the following description will be limited to solely the block 61, with transmission of the data signal at a higher transmission rate than the rate of the received data signals.

The principle construction, as an integrated circuit, of one such multiplexing/demultiplexing block 61 will now be described in more detail with reference to FIGS. 7, 8 and 9, whereafter the use of the block in the circuit shown in FIG. 6 will be described more thoroughly.

Figure 7:
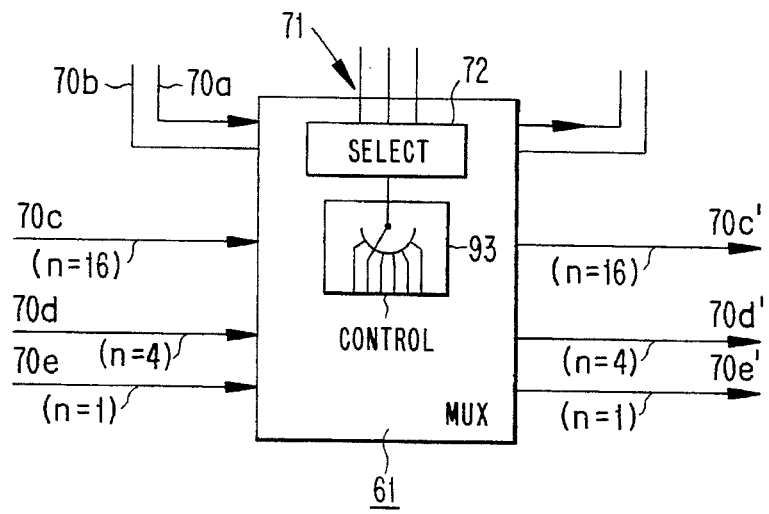
FIG. 7 illustrates the principle construction of a signal receiving and signal transmitting unit in accordance with the present invention.

FIG. 7 illustrates the principle construction of a multiplexing/demultiplexing block 61 or unit according to the present invention.

As shown in FIG. 7, synchronizing signals are delivered to the block 61 on a conductor 70a, while clock pulses arrive on a conductor 70b, the effect of these clock pulses being well known to the person skilled in this art and will not therefore be described here.

It can be mentioned in this regard that the block 61 may well be provided with means for generating internal synchronizing signals.

The block 61 is constructed to include three different inputs, referenced 70c, 70d and 70e, and three different outputs, referenced 70c', 70d' and 70e'.

Each of the inputs is adapted for receiving information-carrying digital signals in data cells having mutually different transmission rates.

Each of the outputs is adapted for transmitting information-carrying digital signals in data cells at different transmission rates.

More particularly, the input 70c and the output 70c' are both adapted for a transmission rate of 155 Mb/s.

The input 70c and the output 70c' are both comprised of sixteen conductors, wherein the data packets are transmitted on each of these conductors serially and together form a series transmission through grouped links.

The input 70d and the output 70d' are both adapted for a transmission rate of 622 Mb/s, wherein they are each comprised of four conductors and the data packets occur on each of said conductors serially and together form a series transmission through grouped links.

The input 70e and the output 70e' are both adapted for a transmission rate of 2.5 Gb/s and are comprised of one single conductor adapted for transmitting data packets or data cells serially in sequence.

According to the invention, such a unit is able to freely select a conversion mode through the medium of a control signal, such that each of the three available inputs 70c, 70d and 70e can be connected to an output selected from the three available outputs 70c', 70d' or 70e'.

The choice of a specific input and a specific output, the so-called conversion mode, is effected in accordance with signals that occur on one or more control conductors 71, wherein a selected control conductor and/or signal-carried information initiates a circuit 72 which selects the relevant conversion mode through the medium of a control block 93 with a selected conversion index adapted for a specific application.

The placement of such a unit or block 61 in switch equipment, or elsewhere, thus becomes more or less determinative of which conversion mode shall be selected and be applicable to the selected application.

Figure 8:
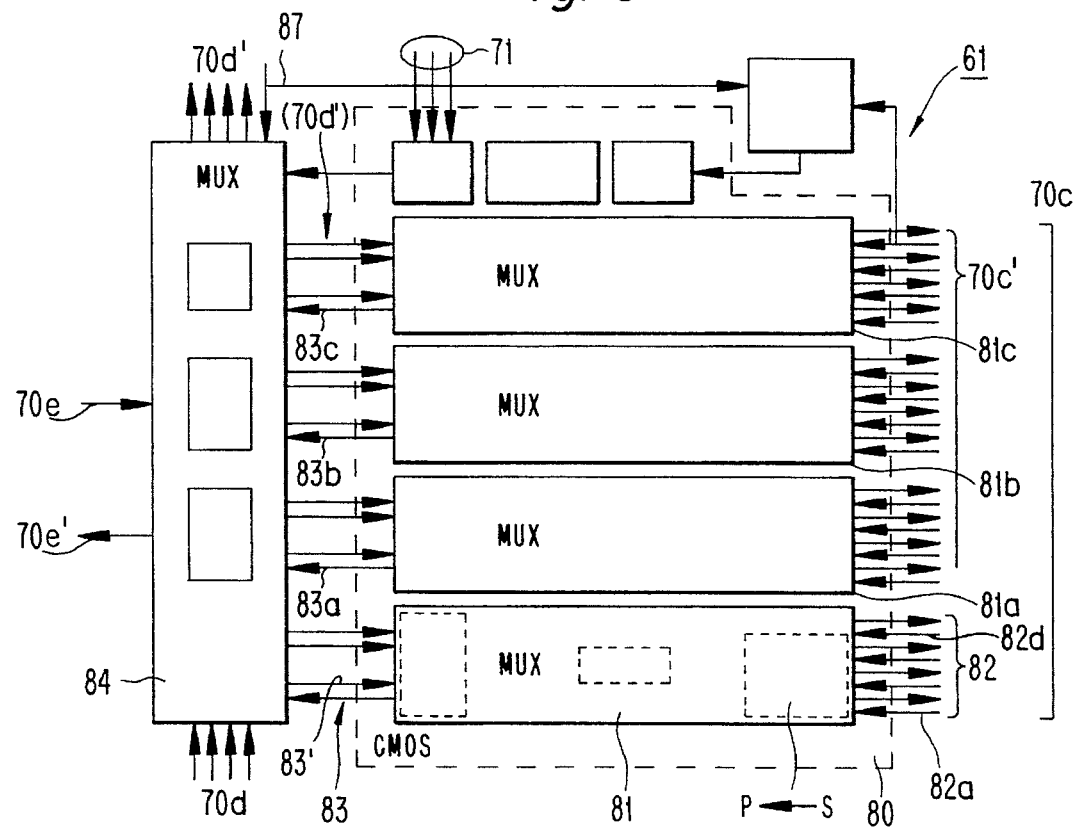
FIG. 8 is a block schematic illustrating a Bi-CMOS integrated circuit for certain parts of the unit, including five multiplexing/demultiplexing blocks among other things.

FIG. 8 is a block schematic which illustrates the multiplexing/demultiplexing block 61 of FIG. 7 in more detail.

The block 61 is constructed on a digital Bi-CMOS circuit and utilizes a CMOS section 80 which is laid on said circuit and has four mutually identical sub-blocks 81, 81a, 81b and 81c.

The input 70c includes four input conductors for the sub-block 81, four input conductors for the sub-block 81a, and so on, making a total of sixteen conductors.

The sub-blocks 81, 81a, 81b and 81c are also provided with four times four output conductors 70c'.

Each of the sub-blocks 81, 81a, 81b and 81c has a respective output conductor, such as the conductor 83 for the sub-block 81.

All four output conductors 83, 83a, 83b and 83c form input conductors to a fifth sub-block 84 which, in principle, is of the same construction as the sub-block 81.

The sub-block 84 includes four input conductors 70d, four output conductors 70d' and an output conductor 70e'.

In the case of the FIG. 8 illustration, the block 61 is adapted for a multiplexing and a demultiplexing function, wherein in the case of the multiplexing function data signals occurring on the input 70c have a rate of 155 Mb/s, while data signals occurring on the outputs 83, 83a, 83b and 83c have a rate of 622 Mb/s.

Signals occurring on the output 70e' of the sub-block 84 have a rate of 2.5 Gb/s.

The signal flow travels in the opposite direction in the case of a demultiplexing function.

Figure 9:
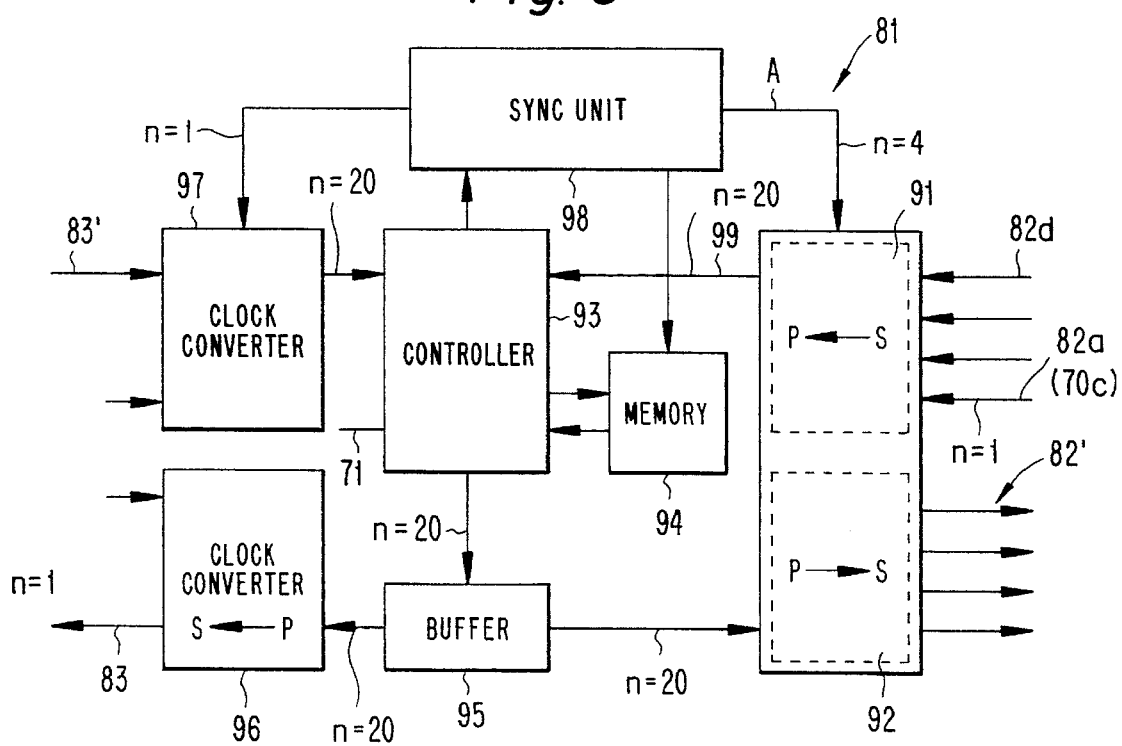
FIG. 9 is a block schematic illustrating such a block, which includes CMOS transistors.

FIG. 9 is a block schematic which illustrates the sub-block 81 in more detail.

The input conductors 70c are represented in the FIG. 9 illustration by the four incoming conductors 82a . . . 82d.

Each of the conductors 82a . . . 82d is adapted for a maximum transmission rate of 155 Mb/s for data packets in the form of ATM cells used in this case.

The circuit 95 is able to transmit data-containing output signals at a frequency of 622 Mhz on the conductor 83, with the aid of a series-parallel converter 91 and a memory 94 among other things.

It has previously been mentioned in the description that each of the inputs 70c, 70d and 70e and each of the outputs 70c', 70d' and 70e' can be coupled selectively so as to obtain a desired rate conversion, and that a relevant conversion mode is activated by an activating signal arriving on one or more of the conductors 71 (FIG. 8).

System-related clock pulses occur on the conductor or line 87.

Referring back to FIG. 9, it will be seen that each of the input conductors 82a . . . 82d of the sub-block 81 is connected to a series-parallel converter 91. The digital signals arriving on the conductors 82a . . . 82d thus converted by a four-channel series-parallel converter to 20-bit parallel transmission, wherein the signals are delivered on a conductor or line 99 to a control logic 93 where they are processed at an internal rate.

Requisite synchronization is effected through a synchronizing unit 98.

Data signals converted to a parallel format are delivered to a control block or control logic 93 and from there to a memory 94, a RAM memory. Information stored in the RAM memory, is delivered therefrom, or from a ROM memory, through control logic 93 to a buffer circuit 95, which in turn delivers the information to a single-channel parallel-series converter and clock pulse converter 96.

When converting in the reversed sense, signals arrive on the conductor 83' to a single-channel series-parallel converter and clock pulse converter 97, whereafter data signals in parallel format are delivered to the control block 93, stored in the memory 94 and then delivered in parallel format to the buffer circuit 95, whereafter they are transmitted to a parallel-series converter 92 and fed out on the conductors 82'.

The exemplifying embodiment illustrates the invention in the form of a functional block, and since such blocks are previously known or can be constructed readily by the skilled person in this field without requiring work of an inventive nature, and with the guidance of general technology in the field and with the aid of obvious expedients, certain parts have not been described in detail.

With regard to the signals on the conductor 71, it is assumed that parallel-transmitted bit positions on the three conductors of relevant bit configuration point to the relevant conversion mode.

This bit configuration is transmitted to each of the control logic circuits, for instance circuit 93, which therewith calculates and selects the necessary signal flow and conversion mode.

It will also be noted that the clock pulse rate for the internal signal processing is about 30 Mhz.

A signal receiving and signal transmitting unit of the aforedescribed kind can be used advantageously with a circuit arrangement described and illustrated in a Patent Application filed on the same date as the present Application and entitled "A Signal Processing Unit", or a unit described and illustrated in a Patent Application filed on the same day as the present Application and entitled "A Multiplexing/Demultiplexing Unit", or in an arrangement described and illustrated in a Patent Application filed on the same day as the present Application and entitled "A Synchronizing Circuit Arrangement".

Reference is made to these coterminous Patent Applications for a deeper understanding of the application of the invention, and the contents of these Applications shall be taken to form part of the present Application.

It will be understood that the invention is not restricted to the aforedescribed and illustrated exemplifying embodiment thereof and that modifications can be made within the scope of the inventive concept as illustrated in the following claims.

What is claimed is:

1. A signal receiving and signal transmitting unit for converting a first transmission rate of a received information carrying signal to a second transmission rate of a transmitted information carrying signal that is different from the first transmission rate, said unit comprising:

a plurality of signal receiving inputs for receiving information carrying signals, wherein each input is structured to receive information carrying signals at a different rate;

a plurality of signal transmitting outputs for transmitting information carrying signals, wherein each output is structured to transmit information carrying signals at a different rate;

at least one control conductor for supplying control information indicative of a conversion mode to be applied to said received information carrying signals;

control logic for receiving said control information and selecting a corresponding conversion mode;

a memory for receiving said information carrying signals from said inputs; and a buffer circuit for recieving said information carrying signals from said memory and outputting said information carrying signals to said signal transmitting outputs under control of said control logic, wherein the control logic connects one signal receiving input to one signal transmitting output based on said control information, and the unit performs rate conversion, using the control logic, the memory and the buffer circuit, in said selected conversion mode.

2. A signal receiving and signal transmitting unit for converting a first transmission rate of a received information carrying signal to a second transmission rate of a transmitted information carrying signal that is different from the first transmission rate, said unit comprising:

a plurality of signal receiving inputs for receiving information carrying signals, wherein each input is structured for a different transmission rate;

a plurality of signal transmitting outputs for transmitting information carrying signals, wherein each output is structured for a different transmission rate;

at least one control conductor for supplying control information indicative of a conversion mode to be applied to said received information carrying signals; and a number of multiplexing/demultiplexing blocks for converting said first transmission rate of said received information carrying signal to said second transmission rate of said transmitted information carrying signal, wherein the unit connects one signal receiving input to one signal transmitting output depending on the control information, and the unit performs conversion, using said multiplexing/demultiplexing blocks in a conversion mode having a conversion index that is selected and initiated by the control information.

3. A unit according to claim 2, wherein a received information carrying signal and a transmitted information carrying signal are comprised of data packets or data cells, each data packet including at least an addressable part and an information carrying part.

4. A unit according to claim 3, wherein the inputs and outputs contain a number of conductors and are structured for a transmission rate that increases by a factor of four, with the number of conductors decreasing by a factor of four.

5. A unit according to claim 3, wherein the inputs and outputs are structured for three different transmission rates.

6. A unit according to claim 3, wherein the unit converts received data cells to an internal parallel format that is chosen commonly for each input and each output.

7. A unit according to claim 2, wherein the inputs and outputs contain a number of conductors and are structured for transmission rates that increase by a factor of four, with the number of conductors decreasing by a factor of four.

8. A unit according to claim 7, wherein respective inputs and outputs are structured for both receiving and transmitting traffic.

9. A unit according to claim 8, wherein the unit converts a received information carrying signal to an internal parallel format that is chosen commonly for each input and each output.

10. A unit according to claim 7, wherein the unit converts a received information carrying signal to an internal parallel format that is chosen commonly for each input and each output.

11. A unit according to claim 2, wherein the inputs and outputs are structured for three different transmission rates.

12. A unit according to claim 11, wherein the unit converts a received information carrying signal to an internal parallel format that is chosen commonly for each input and each output.

13. A unit according to claim 2,
wherein said number of multiplexing/demultiplexing blocks converts received, low transmission rate signals from the plurality of inputs to a signal having a transmission rate that is four times higher than said low transmission rate.

14. A unit according to claim 13, wherein a multiplexing/demultiplexing block comprises:

a first stage in a series-parallel circuit for converting an input signal;

a memory for storing the signal converted by the first stage;

a buffer circuit for receiving and outputting the stored converted signal; and a parallel-series converter having a clock pulse converter for receiving the signal output from the buffer circuit.

15. A unit according to claim 14, wherein memories and buffer circuits are used for transmitting signals in one direction for multiplexing and in another direction for demultiplexing.

16. A unit according to claim 14, wherein the unit converts a received information carrying signal to an internal parallel format that is chosen commonly for each input and each output.

17. A unit according to claim 13, wherein the unit converts a received information carrying signal to an internal parallel format that is chosen commonly for each input and each output.

18. A unit according to claim 2, wherein the unit converts a received information carrying signal to an internal parallel format that is chosen commonly for each input and each output.

19. A unit according to claim 18, wherein a clock pulse rate for processing signals with the internal parallel format is lower than a clock pulse rate applicable to signals at the inputs and outputs.

20. A unit according to claim 19, wherein one of the plurality of inputs is connected to one of the plurality of outputs via synchronizing logic, the memory, the buffer circuit, and control logic.

21. A unit according to claim 2, wherein a total signal bandwidth for incoming signals corresponds to a total signal bandwidth for outgoing signals.

\* \* \* \* \*